(12) United States Patent
Schumann et al.

(10) Patent No.: US 7,044,543 B2
(45) Date of Patent: May 16, 2006

(54) HEIGHT-ADJUSTABLE VEHICLE SEAT HAVING A CRASH LOCKING UNIT

(75) Inventors: Kai Schumann, Rieschweiler-Mühlbach (DE); Ingo Teufel, Rockenhausen (DE); Dieter Braun, Otterberg (DE); Heinrich Hammann, Lohnsfeld (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/154,969

(22) Filed: Jun. 16, 2005

(65) Prior Publication Data
US 2005/0231012 A1    Oct. 20, 2005

Related U.S. Application Data

(63) Continuation of application No. PCT/EP2004/001083, filed on Feb. 6, 2004.

(30) Foreign Application Priority Data

Feb. 19, 2003 (DE) ................. 103 06 828

(51) Int. Cl.
*B60N 2/42* (2006.01)
(52) U.S. Cl. ................. 297/216.1; 297/216.19; 297/216.16; 297/216.2
(58) Field of Classification Search ........... 297/216.19, 297/216.2, 216.1, 216.16; 248/419
See application file for complete search history.

(56) References Cited

U.S. PATENT DOCUMENTS 5,324,095 A * 6/1994 Yamauchi ............. 297/344.14
5,556,159 A 9/1996 Canteleux
5,782,533 A 7/1998 Fischer et al.
5,882,061 A 3/1999 Guillouet
5,882,080 A 3/1999 Houghtaling et al.
6,478,378 B1 11/2002 Mühlberger et al.
6,733,075 B1 5/2004 Schumann et al.
6,755,469 B1 * 6/2004 Akaike et al. ......... 297/344.15
6,786,543 B1 * 9/2004 Andersson et al. .... 297/216.13
6,921,133 B1 * 7/2005 Taoka et al. ........... 297/216.16
2001/0045766 A1 * 11/2001 Deptolla ................. 297/216.2

(Continued)

FOREIGN PATENT DOCUMENTS

DE    44 08 219 A1    9/1995

(Continued)

OTHER PUBLICATIONS

U.S. Appl. No. 11/206,236; Filed Aug. 7, 2005; In re: Kai Schumann et al., entitled *Height-Adjustable Vehicle Seat With A Crash Blocking Unit*.

Primary Examiner—Peter M. Cuomo
Assistant Examiner—Sarah B. McPartlin
(74) Attorney, Agent, or Firm—Womble Carlyle Sandridge & Rice, PLLC

(57) ABSTRACT

A vehicle seat (1), in particular a motor vehicle seat, has a multi-bar linkage (4) which is defined by at least four link mechanisms (5, 6, 7, 8, 9) and is intended for setting the seat height, and a crash locking unit (21). The link mechanisms include a frame (5), which is fixed on the vehicle structure, and a rocker (8). In the event of a crash, the crash locking unit (21) locks the frame (5) and the rocker (8) to each other. An additional link mechanism (7) is provided between the frame (5) and the rocker (8).

20 Claims, 2 Drawing Sheets

U.S. PATENT DOCUMENTS

| | | |
|---|---|---|
| 2003/0042771 A1* | 3/2003 | Teufel et al. ............ 297/216.1 |
| 2003/0213885 A1* | 11/2003 | Schumann et al. ......... 248/419 |
| 2004/0160095 A1* | 8/2004 | Swierczewski ........ 297/216.15 |

FOREIGN PATENT DOCUMENTS

| | | |
|---|---|---|
| DE | 195 44 169 A1 | 5/1997 |
| DE | 697 00 026 T2 | 4/1999 |
| DE | 199 53 630 A1 | 5/2001 |
| DE | 100 18 828 C1 | 10/2001 |
| DE | 100 56 082 A1 | 5/2002 |
| DE | 101 37 298 C1 | 10/2002 |
| EP | 0 806 319 A1 | 11/1997 |

* cited by examiner

HEIGHT-ADJUSTABLE VEHICLE SEAT HAVING A CRASH LOCKING UNIT

CROSS-REFERENCE TO RELATED APPLICATION

The present application is a continuation of International Application PCT/EP2004/001083, which was filed Feb. 6, 2004, and is incorporated herein by reference, in its entirety.

BACKGROUND OF THE INVENTION

The invention relates to a vehicle seat, in particular a motor vehicle seat, having a multi-bar linkage and a crash locking unit, wherein in the normal situation, the multi-bar linkage is effective as a four-bar linkage for setting the seat height, and wherein in the event of a crash, the crash locking unit locks at least two of the links of the multi-bar linkage to one another.

In the case of a vehicle seat of the above-described type known from U.S. Pat. No. 6,478,378, in order to relieve the load on the height-adjustable drive, a crash locking unit is provided between the seat frame and the rear-rocker, said unit being activated by a change in geometry of the four-bar linkage that is suspended under prestress. However, for certain uses it would be desirable if the four-bar linkage were to experience a change in geometry which is as small as possible.

BRIEF SUMMARY OF SOME ASPECTS OF THE INVENTION

In accordance with one aspect, the present invention is based on the object of improving a vehicle seat of the type mentioned above. In accordance with one aspect of the present invention, a vehicle seat, in particular a motor vehicle seat, includes at least one multi-bar linkage and a crash locking unit. The multi-bar linkage is effective as a four-bar linkage for setting the seat's height prior to a crash of predetermined magnitude. The multi-bar linkage can include a frame that can be fixed with respect to the vehicle structure, a rocker, and a link mechanism positioned between the frame and the rocker. The crash locking unit is for locking at least the frame and the rocker to one another in the event of the crash of predetermined magnitude.

Because the crash locking unit locks a frame, which is for being fixed on the vehicle structure, and a rocker to each other, the frame and rocker forming two of the link mechanisms of the multi-bar linkage, and a further link mechanism being provided between the frame and the rocker, a better input of force from the seat superstructure into the vehicle structure is made possible and the multi-bar linkage becomes stiffer overall, with the result that the multi-bar linkage experiences only a very small deformation and therefore change in geometry, i.e. the locking takes place with a very small movement of the multi-bar linkage. Therefore, for example, a belt attachment point fixed on the seat frame is only slightly displaced forward, which significantly increases the efficiency of the seat belt and of the airbag.

In the normal situation, the multi-bar linkage is effective as a four-bar linkage. Then, in the event of a crash, the multi-bar linkage is preferably first of all a five-bar linkage, in order to carry out a change in geometry, and then, by the locking of the crash locking unit, the multi-bar linkage preferably becomes a rigid three-bar linkage which does not permit any further movement. The crash locking unit locks preferably in a positively controlled manner owing to a change in geometry of the multi-bar linkage that occurs, for example, during the five-bar-linkage phase. The solution according to the invention may therefore also be used without electrical current and without crash sensor information items for purely manual seat designs and blocks rapidly. The change in geometry of the multi-bar linkage preferably takes place reversibly. This has the advantage, over systems having shearing-off pins or the like, that the vehicle seat does not need to undergo costly repairs after every type of crash.

In one embodiment which is simple to produce, the crash locking unit has a latch, which is effective in two directions and is mounted pivotably on one of the link mechanisms, for example the rocker; and a mating element, which is attached fixedly to the other link mechanism, i.e. on the frame, for example. A crash locking unit of this type is effective both in the case of a head-on crash and also in the case of a rear-end crash. The link mechanism which is provided between the frame and the rocker, which locks to it in the event of a crash, is preferably coupled to the latch in order to release the locking movement of the latch in a simple manner. Accordingly, in the event of a crash, a movement of this link mechanism which is provided in between is envisaged. The preferred coupling is a slot and pin guide which makes length compensation possible at the same time and, as a result, permits a multiplicity of starting geometries for the components.

In one preferred embodiment, two adjacent link mechanisms of the multi-bar linkage are connected rigidly to one another in the normal situation by means of a locking unit, i.e. the multi-bar linkage initially has one less degree of freedom. This locking unit then opens in the event of a crash, preferably reversibly, with the result that a further degree of freedom is available. This degree of freedom can be used to bring about the change in geometry which leads to the positively controlled locking of the crash locking unit. The link mechanisms which are connected to one another by means of the locking unit are preferably the rocker, which locks to the frame in the event of a crash, and the link mechanism which is provided in between and therefore, in the normal situation, forms an extension of the rocker and, in the event of a crash, can, for example, be displaced longitudinally relative to this rocker or—as a further rocker—can be pivoted.

The locking unit retains the two adjacent link mechanisms preferably in a frictional manner, thus defining a limit force which is not reached by loads occurring during use and misuse, but when it is exceeded in the event of a crash opens the locking unit, as a result of which the two link mechanisms are moveable relative to each other, i.e. can carry out the change in geometry. A locking unit of this type can have, for example, a pivotably mounted locking bar on one link mechanism, a counterpart on the other, adjacent link mechanism, and a spring between the locking bar and the link mechanism assigned to it. A locking unit of this type is extremely rapid when released, has good behavior under continuous running, has great resistance to misuse, has simple adjustability, and allows for the defining of the limit force via the spring. The crash locking unit according to the invention can therefore be used for different seat weights and/or crash requirements.

In order to be independent of the type of load, i.e. in order to be effective both in a head-on crash and also in a rear-end crash, the locking bar preferably has two different functional surfaces which bear against the counterpart even under a load in each case outside the self-locking range so as to support a defined opening of the locking unit. The parameters of these functional surfaces serve to adapt them to the different types of crash (types of load) and requirements, it being possible to set the two directions of action such that they differ. In particular, the relevant force components are defined by the bearing angles, which permits a different limit force in the two directions of action, with it being possible to set the absolute level in a simple manner via the spring. The crash locking unit also functions independently of the type of load, but remains unlocked in the case of loads incurred under use and misuse.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which.

Figure 1:
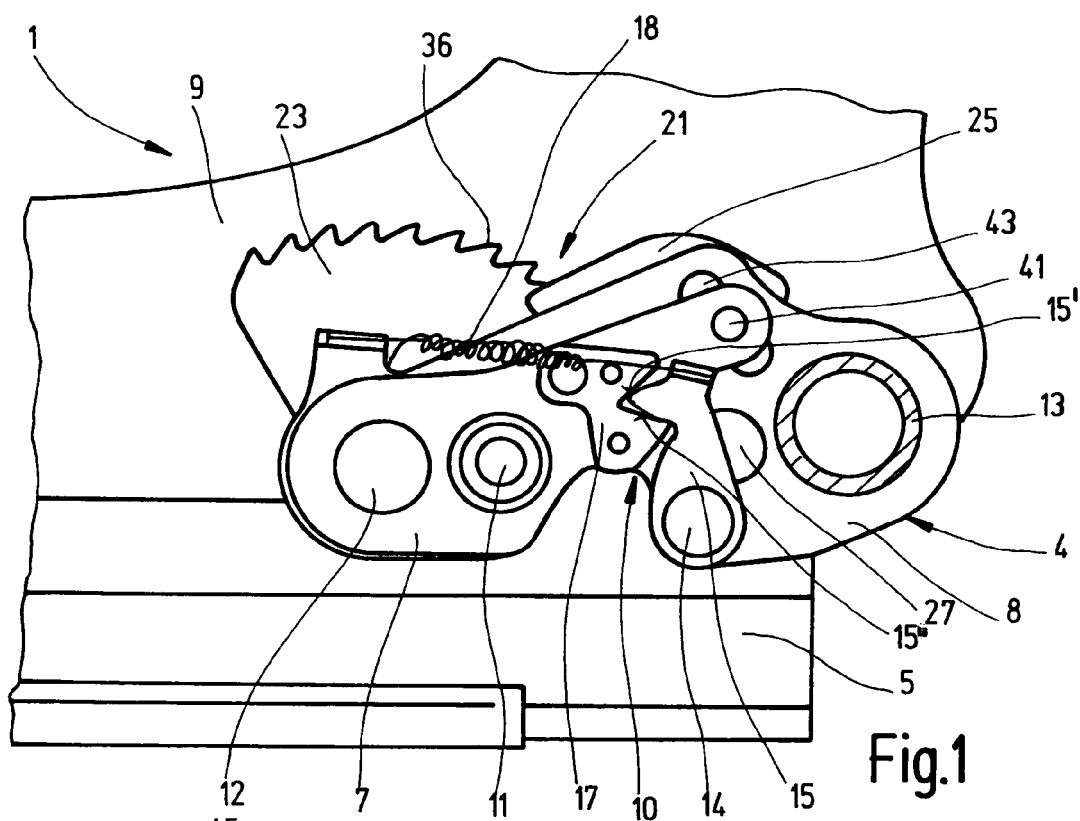
FIG. 1 shows a partially cut-away view of the region of the rear, right corner of the first exemplary embodiment in the normal situation, the view showing the inwardly facing side.
Figure 2:
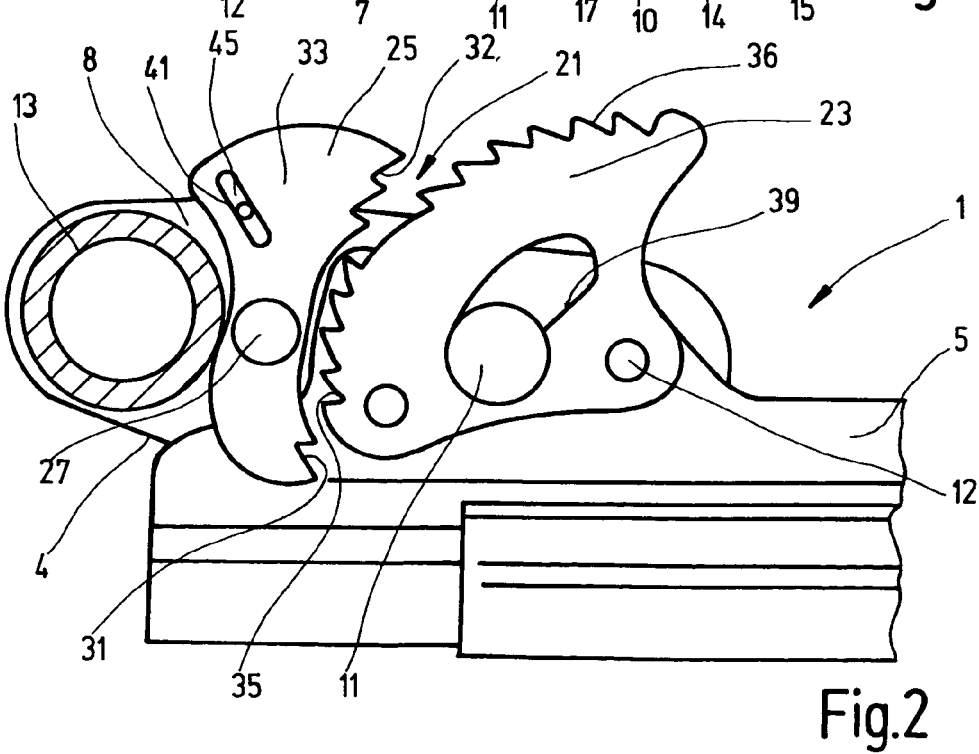
FIG. 2 shows a view corresponding to FIG. 1 showing the outwardly facing side without the seat frame.
Figure 3:
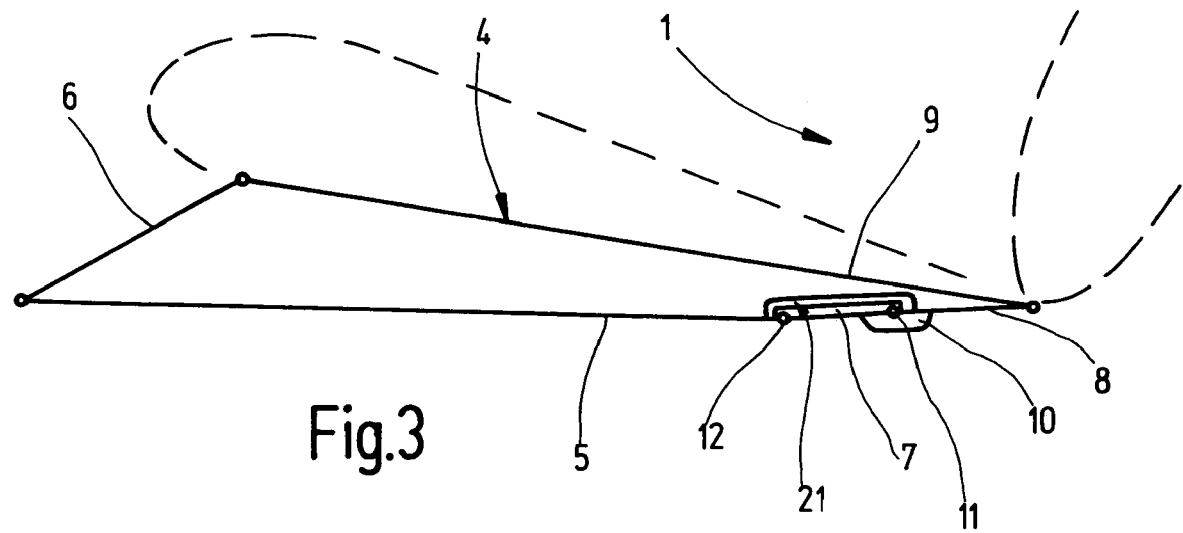
FIG. 3 shows a schematic basic diagram of a vehicle seat with the upholstery shown by dashed lines.
Figure 4:
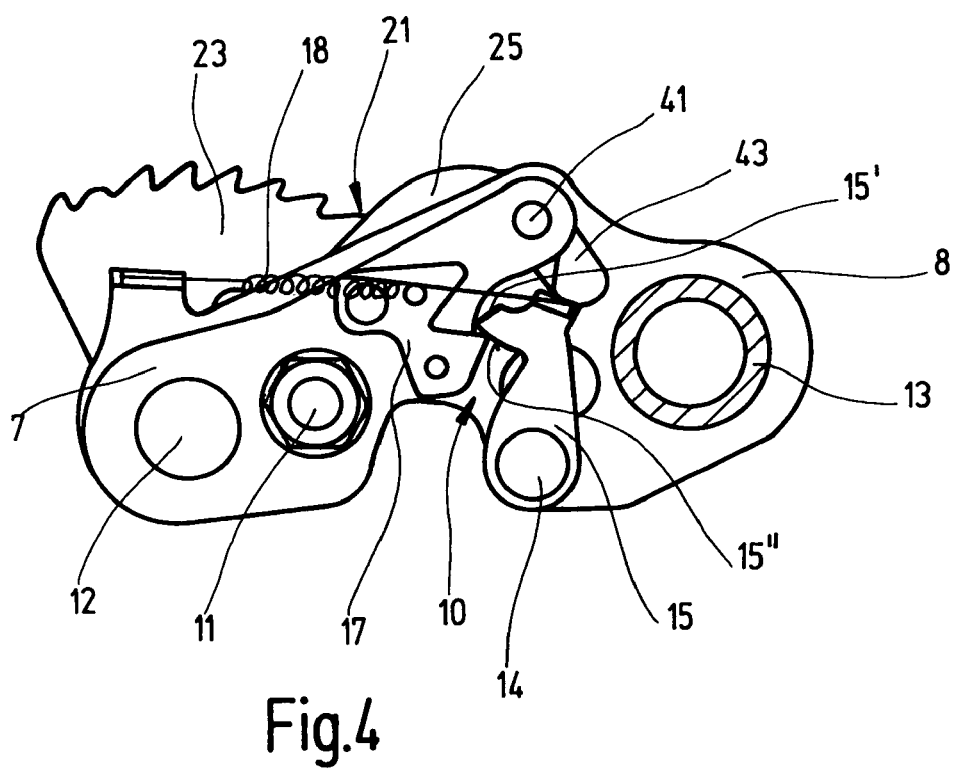
FIG. 4 shows a view corresponding to FIG. 1 of the rockers together with the locking unit and crash locking unit in the event of a head-on crash.

DESCRIPTION OF AN EXEMPLARY
EMBODIMENT OF THE INVENTION

A height-adjustable vehicle seat I is provided for a motor vehicle. Multi-bar linkages are on both sides of the vehicle seat 1 and function as height adjusters for the vehicle seat. More specifically in the exemplary embodiment, a four-bar linkage, which is movable by motor, is on the left side of the vehicle seat 1, and a multi-bar linkage 4 is on the other, i.e. right side, of the vehicle seat 1. The multi-bar linkage 4 is effective in the normal situation, i.e. other than the crash situation, as a four-bar linkage and has dimensions corresponding to the motor-driven four-bar linkage.

The multi-bar linkage 4 comprises five link mechanisms, namely a frame 5, a front rocker 6, a control rocker 7, a carrier rocker 8, and a connector 9. The frame 5 is to be connected in a fixed manner on the vehicle structure. In the present case the frame 5 is an upper rail of a pair of seat rails serving as a longitudinal adjuster for the vehicle seat 1. The front rocker 6 is coupled to the frame 5. The control rocker 7 is coupled to the rear of the frame 5. The carrier rocker 8 is coupled to the control rocker 7. The connector 9 is coupled to the front rocker 6 and the carrier rocker 8. In the present case, the connector 9 is a seat-frame side part.

In the normal situation, the control rocker 7 is connected rigidly to the carrier rocker 8 by means of a locking unit 10 (described below). The multi-bar linkage 4 is therefore a five-bar linkage but, in the normal situation, the multi-bar linkage 4 acts as a four-bar linkage by the control rocker 7 and carrier rocker 8 being locked together. The carrier rocker 8 is coupled to the control rocker 7 by means of a connecting bolt 11. The control rocker 7 is coupled to the frame 5 by means of a joint bolt 12. A round transverse tube 13 serves as the coupling point between the carrier rocker 8 and the connector 9, and at the same time the transverse tube 13 forms part of the seat frame. The carrier rocker 8 surrounds the joint bolt 12 with play by means of an elongated hole (not specifically illustrated).

For the rigid connection (present in the normal situation) between the control rocker 7 and the carrier rocker 8, the locking unit 10 has, on the carrier rocker 8 in a region behind the connecting bolt 11, a locking bar 15. The locking bar 15 is coupled to the carrier rocker 8 by means of a locking-bar bearing bolt 14. The locking bar 15 engages in a counterpart 17 which is connected rigidly to the control rocker 7. In this case, the locking bar 15 has an upper functional surface 15', which comes into effect in the case of a rear-end crash, and a lower functional surface 15" which is relevant to the head-on crash. A spring 18 designed as a tension spring is fitted between the locking bar 15 and an angled section of the carrier rocker 8, which section is provided in front of the connecting bolt 11. The spring 18 prestresses the locking bar 15 so that the locking bar 15 engages in the counterpart 17. The angles between the functional surfaces 15' and 15", on the one hand, and the corresponding bearing surfaces of the counterpart 17 are situated outside the self-locking range. In this case, the prestressing of the spring 18 defines a limit force up to which the locking unit 10 is retained in a frictional manner, i.e. the control rocker 7 and the carrier rocker 8 are connected rigidly to each other.

A crash locking unit 21 of the five-bar linkage 4, which unit locks in the event of a crash, has a toothed segment 23 attached to the frame 5 and a latch 25 which is mounted pivotably on the carrier rocker 8 by means of a latch bearing bolt 27. The latch 25, which is of a two-armed design that is arranged approximately vertically, has two regions of teeth, specifically a lower region of teeth 31 and an upper region of teeth 32. The center of gravity 33 of the latch 25 is in the vicinity of the upper region of teeth 32 on account of the shape and material of the latch 25. The teeth of the two regions of teeth 31 and 32 are directed slightly radially outward with respect to the two possible pivoting directions of the latch 25.

The toothed segment 23, which is curved around the joint bolt 12 and is arranged at a small distance from the latch 25, is provided as a mating element to the latch 25. The toothed segment 23 likewise has two regions of teeth, namely a lower toothed segment region 35, which is designed for interaction with the lower region of teeth 31 of the latch 25, i.e. is provided with teeth which are slightly upwardly directed, and an upper toothed segment region 36, which is designed for interaction with the upper region of teeth 32 of the latch 25, i.e. is provided with teeth which are slightly downwardly directed.

During a pivoting movement of the control rocker 7 and of the carrier rocker 8 locked to it about the joint bolt 12, as occurs in the case of a height adjustment of the vehicle seat 1, the regions of teeth 31 and 32 of the latch 25 migrate along the toothed segment regions 35 and 36. In order to be able to ensure an interaction in every setting of the five-bar linkage 4, the toothed segment regions 35 and 36 are therefore designed to be longer than the corresponding regions of teeth 31 and 32. To improve the guidance, the connecting bolt 11 protrudes through a slotted guide 39 of the toothed segment 23, which slotted guide is curved around the joint bolt 12.

For a coupling between the latch 25 and the control rocker 7, at the upper end of the control rocker 7 that is situated away from the joint bolt 12, a pin 41 protrudes parallel to the joint bolt 12 and engages through an aperture 43 in the carrier rocker 8, and the upper end of which is guided in an elongated hole 45 of the latch 25.

In the event of a crash, because of the force on the backrest (rear-end crash) or on the belt buckle and/or the belt attachment point (head-on crash) and the locking of the motor-driven four-bar linkage on the other side of the vehicle seat, a torque is in effect via the transverse tube 13 and attempts to lower the multi-bar linkage 4 (rear-end crash) or to raise it (head-on crash). This torque produces a counter torque on the joint bolt 12, which attempts to rotate the control rocker 7 relative to the carrier rocker 8. The spring 18 initially still keeps the locking bar 15 in the counter part 17, the upper functional surface 15' (rear-end crash) or the lower functional surface 15" (head-on crash) attempting to come out of the counterpart 17. As soon as the limit force is exceeded, the locking bar 15 comes free, with the result that the locking unit 10 opens and the rigid connection between the control rocker 7 and the carrier rocker 8 is removed. The multi-bar linkage 4 is now a genuine five-bar linkage which undergoes a small change in geometry owing to the pivoting movement between the carrier rocker 8 and the control rocker 7.

Via the coupling to the pin 41, this pivoting movement causes the latch 25 to be pivoted, which results in a positively controlled toothed engagement of the latch 25 in the toothed segment 23, specifically, in the case of the rear-end crash, of the lower region of teeth 31 in the lower toothed segment region 35 and, in the case of the head-on crash, of the upper region of teeth 32 in the upper toothed segment region 36. As a result, the carrier rocker 8 is locked by the crash locking unit 21 to the frame 5 with the control rocker 7 being bridged, i.e. the multi-bar linkage 4 which becomes a rigid three-bar linkage is locked, and the entire system becomes stiffer. The crash loads can thus be guided directly into the vehicle structure and therefore cause only a small deformation in the seat structure. Owing to the small change in geometry, a belt attachment point or belt-buckle attachment point provided in the region of the connector 9 is only slightly displaced forward.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A vehicle seat for being mounted to a vehicle structure, and for operating advantageously in the event of a crash of predetermined magnitude, the vehicle seat comprising:
   at least one multi-bar linkage, wherein the multi-bar linkage includes at least four link mechanisms, wherein prior to the crash of predetermined magnitude the multi-bar linkage is effective as a four-bar linkage for setting the seat's height, and wherein the at least four link mechanisms includes at least
      (a) a frame for being fixed with respect to the vehicle structure,
      (b) a rocker, and
      (c) a link mechanism positioned between the frame and the rocker;
   a crash locking unit for locking at least the frame and the rocker to one another in the event of the crash of predetermined magnitude; and
   a second locking unit, wherein
   for two adjacent link mechanisms of the at least four link mechanisms, the second locking unit provides a frictional interaction by way of which the second locking unit rigidly connects the two adjacent link mechanisms together prior to the crash of predetermined magnitude,
   the second locking unit is operative for opening after a limit force is exceeded in response to the crash of predetermined magnitude, so that relative movement can occur between the two adjacent link mechanisms, and
   the second locking unit includes
      (a) a locking bar pivotably mounted on a first of the two adjacent link mechanisms,
      (b) a counterpart on a second of the two adjacent link mechanisms, and
      (c) a spring between the locking bar and the first of the two adjacent link mechanisms.

2. The vehicle seat as claimed in claim 1, wherein:
   the multi-bar linkage is operative for at least temporarily becoming effective as a five-bar linkage in response to the crash of predetermined magnitude, and
   the crash locking unit is operative so that the locking, which is provided by the crash locking unit in response to the crash of predetermined magnitude, causes the multi-bar linkage to become effective as a rigid three-bar linkage, whereby the multi-bar linkage becomes effective as the rigid three-bar linkage in response to the crash of predetermined magnitude.

3. The vehicle seat as claimed in claim 2, wherein the crash locking unit is operative so that the locking, which is provided by the crash locking unit in response to the crash of predetermined magnitude, occurs in a positively controlled manner at least partially in response to a change in geometry of the multi-bar linkage from the four-bar linkage to the five-bar linkage.

4. The vehicle seat as claimed in claim 3, wherein the change in geometry of the multi-bar linkage comprises:
   the opening of the second locking unit after the limit force is exceeded in response to the crash of predetermined magnitude, so that relative movement can occur between the two adjacent link mechanisms.

5. The vehicle seat as claimed in claim 2, wherein:
   the crash locking unit includes a latch and a mating element,
   the crash locking unit is operative so that the locking, which is provided by the crash locking unit in response to the crash of predetermined magnitude, includes the latch and the mating element being engaged to one another,
   the latch is effective in two directions,
   the latch is pivotably mounted on one of the frame and the rocker, and
   the mating element is fixedly attached to the other of the frame and the rocker.

6. The vehicle seat as claimed in claim 2, wherein the multi-bar linkage becoming effective as a five-bar linkage comprises:
   the opening of the second locking unit after the limit force is exceeded in response to the crash of predetermined magnitude, so that relative movement can occur between the two adjacent link mechanisms.

7. The vehicle seat as claimed in claim 1, wherein the crash locking unit is operative so that the locking, which is provided by the crash locking unit in response to the crash of predetermined magnitude, occurs in a positively controlled manner at least partially in response to a change in geometry of the multi-bar linkage.

8. The vehicle seat as claimed in claim 7, wherein the change in geometry of the multi-bar linkage takes place reversibly.

9. The vehicle seat as claimed in claim 8, wherein the change in geometry of the multi-bar linkage comprises:

relative movement between the two adjacent link mechanisms, wherein the relative movement between the two adjacent link mechanisms is at least partially in response to the opening of the second locking unit.

10. The vehicle seat as claimed in claim 7, wherein the change in geometry of the multi-bar linkage comprises:
relative movement between the two adjacent link mechanisms, wherein the relative movement between the two adjacent link mechanisms is at least partially in response to the opening of the second locking unit.

11. The vehicle seat as claimed in claim 1, wherein:
the crash locking unit includes a latch and a mating element,
the crash locking unit is operative so that the locking, which is provided by the crash locking unit in response to the crash of predetermined magnitude, includes the latch and the mating element being engaged to one another,
the latch is effective in two directions,
the latch is pivotably mounted on one of the frame and the rocker, and
mating element is fixedly attached to the other of the frame and the rocker.

12. The vehicle seat as claimed in claim 11, wherein the latch is coupled to the link mechanism positioned between the frame and the rocker.

13. The vehicle seat as claimed in claim 11, wherein the latch is coupled, by way of a slot and a pin, to the link mechanism positioned between the frame and the rocker.

14. The vehicle seat as claimed in claim 1, wherein at least one of the locking bar and the counterpart has two different functional surfaces which define different parameters for two opposite directions in which the crash of predetermined magnitude can occur.

15. The vehicle seat as claimed in claim 1, further comprising a lower seat rail, wherein the frame is an upper seat rail that is cooperative with the lower seat rail to provide a longitudinal adjuster for the vehicle seat.

16. A vehicle seat for being mounted to a vehicle structure, and for operating advantageously in the event of a crash of predetermined magnitude, the vehicle seat comprising:
at least one multi-bar linkage, wherein the multi-bar linkage includes at least four link mechanisms, wherein prior to the crash of predetermined magnitude the multi-bar linkage is effective as a four-bar linkage for setting the seat's height, and wherein the at least four link mechanisms includes at least
(a) a frame for being fixed with respect to the vehicle structure,
(b) a rocker, and
(c) a link mechanism positioned between the frame and the rocker;
a crash locking unit for locking at least the frame and the rocker to one another in the event of the crash of predetermined magnitude; and
a second locking unit, wherein
for two adjacent link mechanisms of the at least four link mechanisms, the second locking unit provides a frictional interaction by way of which the second locking unit rigidly connects the two adjacent link mechanisms together prior to the crash of predetermined magnitude, whereby the multi-bar linkage is effective as the four-bar linkage prior to the crash of predetermined magnitude, the second locking unit is operative for opening after a limit force is exceeded in response to the crash of predetermined magnitude, for allowing relative movement between the two adjacent link mechanisms, whereby the multi-bar linkage is at least temporarily effective as a five-bar linkage in response to the crash of predetermined magnitude; and
the crash locking unit is operative so that the locking, which is provided by the crash locking unit in response to the crash of predetermined magnitude, is provided at least partially as a result of the multi-bar linkage becoming effective as the five-bar linkage in response to the crash of predetermined magnitude, and
the second locking unit includes
(a) a locking bar pivotably mounted on a first of the two adjacent link mechanisms,
(b) a counterpart on a second of the two adjacent link mechanisms, and
(c) a spring between the locking bar and the first of the two adjacent link mechanisms.

17. The vehicle seat as claimed in claim 16, wherein:
the crash locking unit includes a latch and a mating element,
the crash locking unit is operative so that the locking, which is provided by the crash locking unit in response to the crash of predetermined magnitude, includes the latch and the mating element being engaged to one another,
the latch is effective in two directions,
the latch is pivotably mounted on one of the frame and the rocker,
the mating element is fixedly attached to the other of the frame and the rocker, and
the latch is coupled to the link mechanism positioned between the frame and the rocker.

18. The vehicle seat as claimed in claim 16, wherein the two adjacent link mechanisms are the rocker and the link mechanism positioned between the frame and the rocker.

19. The vehicle seat as claimed in claim 18, wherein:
the crash locking unit includes a latch and a mating element,
the crash locking unit is operative so that the locking, which is provided by the crash locking unit in response to the crash of predetermined magnitude, includes the latch and the mating element being engaged to one another,
the latch is effective in two directions,
the latch is pivotably mounted on one of the frame and the rocker,
the mating element is fixedly attached to the other of the frame and the rocker, and
the latch is coupled to the link mechanism positioned between the frame and the rocker.

20. The vehicle seat as claimed in claim 16, wherein at least one of the locking bar and the counterpart has two different functional surfaces which define different parameters for two opposite directions in which the crash of predetermined magnitude can occur.

* * * * *